United States Patent
Tunzi et al.

[11] Patent Number: 5,901,562
[45] Date of Patent: May 11, 1999

[54] TEMPERATURE CONTROL SYSTEM FOR A MULTI COMPARTMENT REFRIGERATOR

[75] Inventors: Scott T. Tunzi; Bobbie J. Gilman, both of Galesburg, Ill.

[73] Assignee: Maytag Corporation, Newton, Iowa

[21] Appl. No.: 08/869,429

[22] Filed: Jun. 4, 1997

[51] Int. Cl.[6] .................. F25B 1/00; G05D 23/12
[52] U.S. Cl. .................. 62/229; 62/187; 236/99 D
[58] Field of Search .................. 62/187, 229; 236/78 B, 236/99 D

[56] References Cited

U.S. PATENT DOCUMENTS

| | | | |
|---|---|---|---|
| 2,435,493 | 2/1948 | Cary | 236/99 D |
| 2,667,757 | 2/1954 | Shoemaker | 62/208 |
| 2,724,577 | 11/1955 | Murphy | 62/208 X |
| 3,630,046 | 12/1971 | Boor | 62/187 |
| 3,656,314 | 4/1972 | Jung | 62/97 |
| 4,009,589 | 3/1977 | Webb et al. | 62/180 |
| 4,009,590 | 3/1977 | Webb et al. | 62/180 |
| 4,009,591 | 3/1977 | Hester | 62/180 |
| 4,689,966 | 9/1987 | Nonaka | 62/187 |
| 4,732,010 | 3/1988 | Linstromberg et al. | 62/187 |
| 4,834,169 | 5/1989 | Tershak et al. | 165/30 |
| 4,924,680 | 5/1990 | Janke et al. | 62/187 |
| 5,201,888 | 4/1993 | Beach, Jr. et al. | 62/187 |
| 5,226,729 | 7/1993 | Alford | 236/78 B |
| 5,255,530 | 10/1993 | Janke | 62/180 |
| 5,357,765 | 10/1994 | Thomas et al. | 62/187 |
| 5,385,032 | 1/1995 | Martin et al. | 62/187 |
| 5,388,418 | 2/1995 | Martin et al. | 62/131 |
| 5,425,245 | 6/1995 | Martin et al. | 62/187 |

Primary Examiner—William Wayner
Attorney, Agent, or Firm—Everett G. Diederiks, Jr.

[57] ABSTRACT

A mechanism for controlling the temperature in and the flow of air between freezer and fresh food compartments in a refrigerator is constituted by a pre-assembled control unit including a housing within which is mounted fresh food and freezer compartment control knobs, a thermostatic controller, a temperature sensing capillary tube, a defrost timer, an automatic damper unit for adjusting the opening of an air passageway formed in the housing, and lighting assemblies. The air passageway formed in the housing is adapted to be aligned with an opening leading from the freezer compartment to the fresh food compartment. The capillary tube has one end attached to the thermostatic controller and another end positioned in the air passageway such that the thermostatic controller receives temperature signals from the capillary tube that are associated with not only the temperature of the freezer compartment, but also the temperature of the fresh food compartment. The capillary tube is maintained in the desired position within the air passageway by means of a tube holder. The end of the capillary tube is preferably covered by a sleeve for thermal damping purposes. Since the control mechanism is pre-assembled, only a few mechanical connections are required to secure the entire control mechanism within the refrigerator.

19 Claims, 4 Drawing Sheets

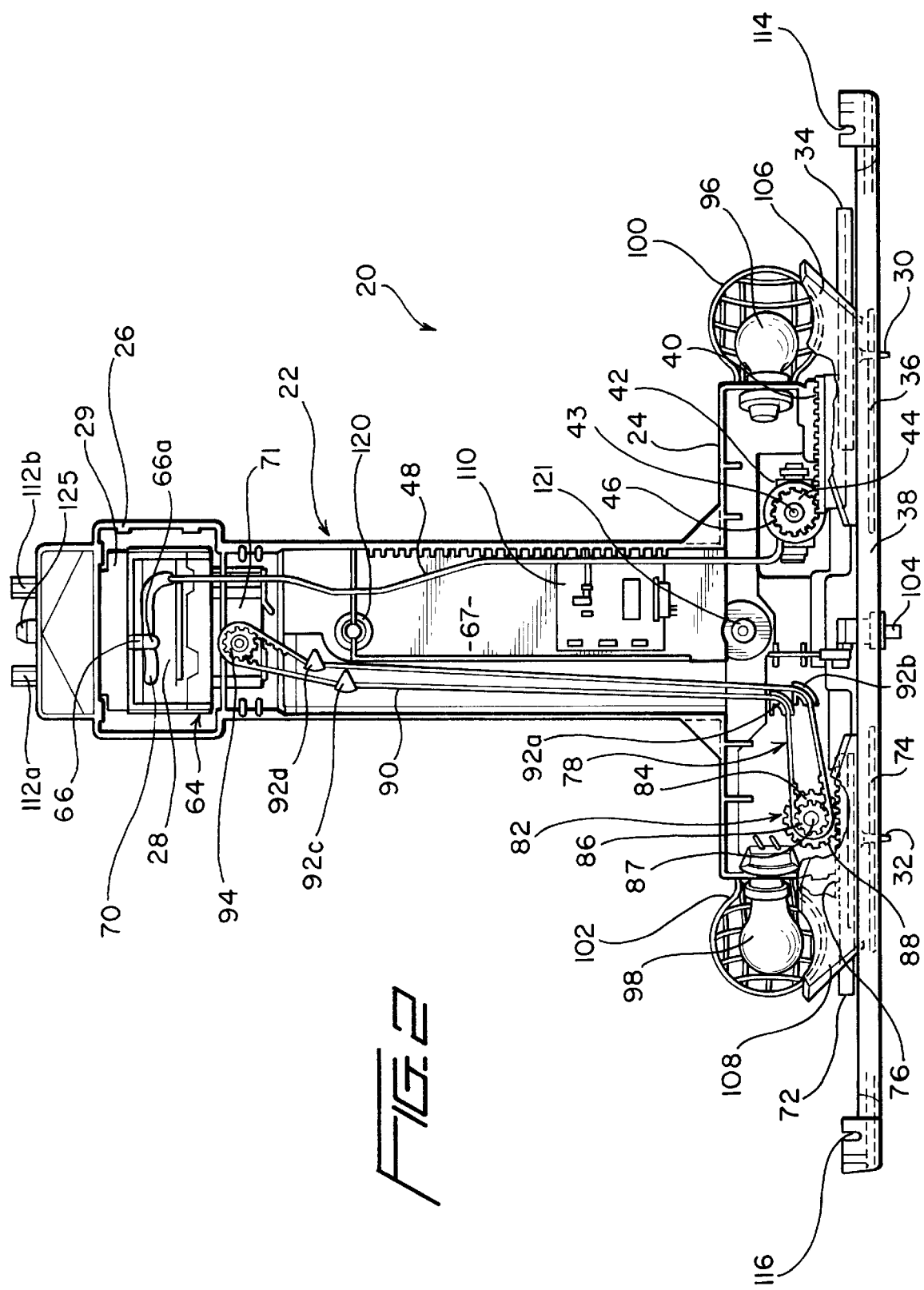

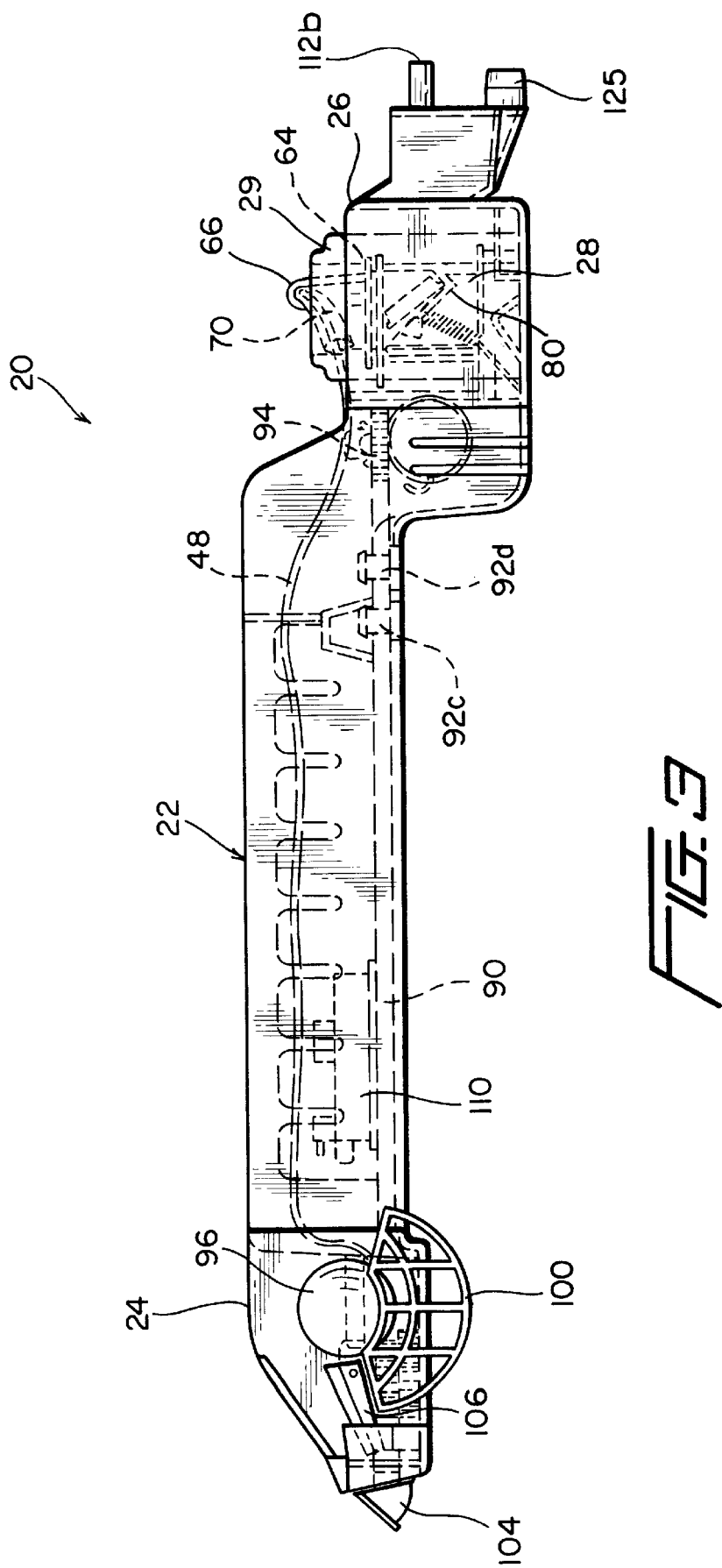

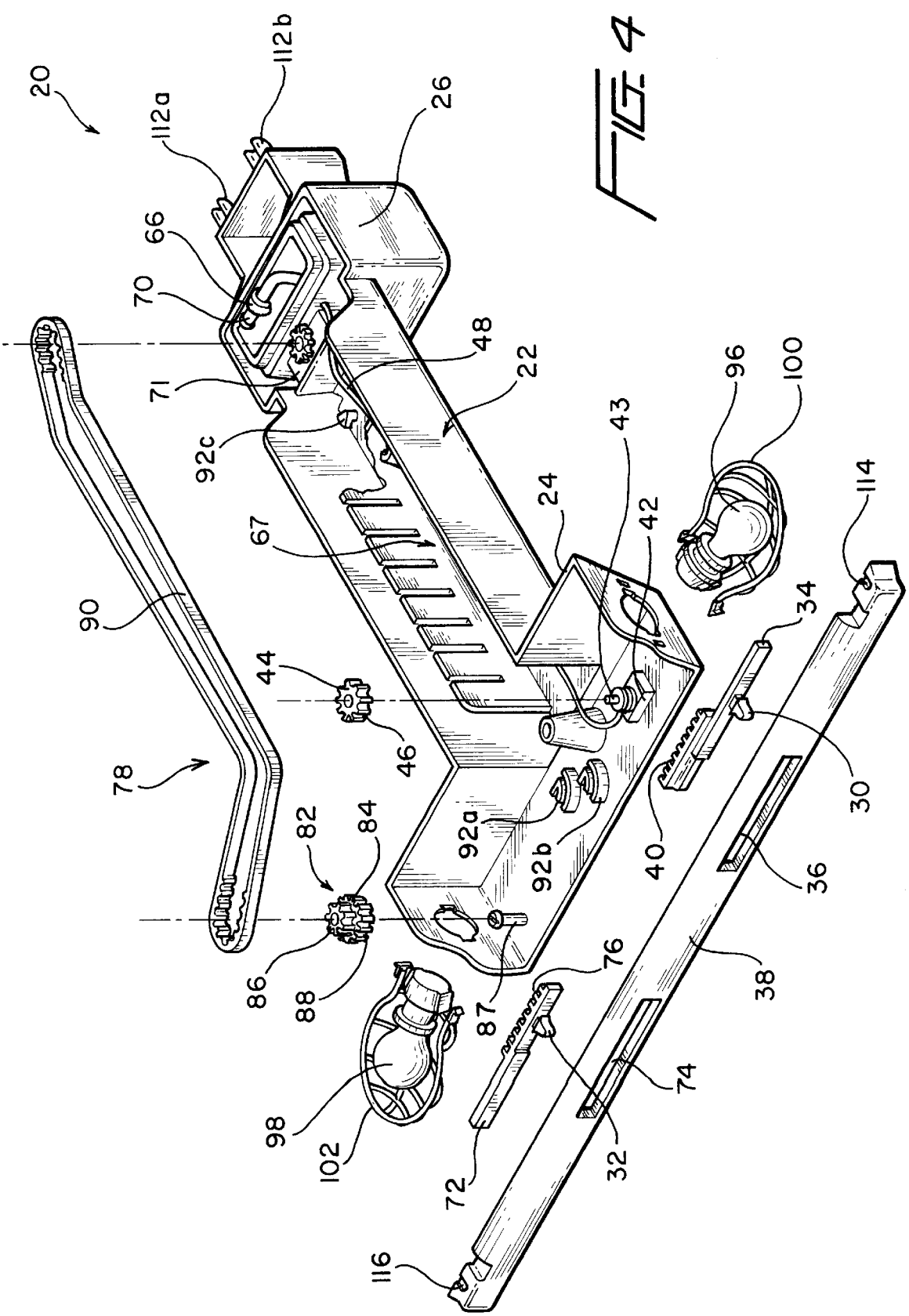

TEMPERATURE CONTROL SYSTEM FOR A MULTI COMPARTMENT REFRIGERATOR

BACKGROUND OF THE INVENTION

1. Field of the Invention

The present invention pertains to the art of two-compartment refrigerators in which a portion of the air being circulated in one compartment is diverted, through a partition wall, into the other compartment and, more particularly, to a mechanism which controls the temperature in each compartment and the flow of air between the two compartments.

2. Discussion of the Prior Art

In two compartment refrigerators, air is generally circulated over an evaporator and then delivered to both a freezer compartment and a fresh food compartment. Typically, two user operated temperature controls are provided. One control member is for controlling the freezer compartment temperature, while the other control member controls the fresh food compartment temperature. The fresh food control is operatively connected to a thermostat unit that senses the temperature in the fresh food compartment by means of a capillary tube routed from the thermostat unit to the fresh food compartment. With this arrangement, the fresh food control thermostatically maintains the fresh food compartment temperature by periodically energizing and de-energizing a compressor of a refrigerator circuit.

The freezer control is connected to an air flow damper positioned in a passageway which delivers air from the freezer to the fresh food compartment. As the freezer control is set to a colder position, the damper is moved to allow less air into the fresh food compartment and the fresh food control responds by increasing the active time of the compressor to maintain the temperature in the fresh food compartment and thereby indirectly cools the freezer compartment. Conversely, if the freezer control is set to a less cold position, the damper moves to allow more air to be sent from the freezer to the fresh food compartment and once again the fresh food compartment control compensates by running the compressor less often. A major disadvantage associated with such a known arrangement is that the fresh food and the freezer controls are not independent. For example, when only the fresh food control is adjusted, the temperature in the fresh food compartment will change as expected but the freezer compartment temperature will also change significantly.

One proposed solution to this problem is to incorporate multiple temperature sensors (see U.S. Pat. No. 5,385,032). More specifically, one capillary tube would be routed from the controls to the freezer compartment and a separate capillary tube would be routed from the controls to the fresh food compartment. However, such an arrangement adds a tremendous cost to the refrigerator because of the difficulty involved in routing the capillary tubes. Another approach is to add multiple independent baffles. One set of baffles would be controlled normally by the freezer control, while another set of baffles would be regulated by an additional control circuit to provide a compensation airflow based on both the fresh food control and the freezer control (see for example U.S. Pat. Nos. 4,009,589, 4,009,590, and 4,009,591). This approach also adds tremendous cost to a refrigerator, not only in the cost of parts but also the necessary time for assembly.

Therefore, there exists a need in the art for a mechanism to control the flow of air between two compartments in a refrigerator which does not require the use of multiple capillary tubes or baffles, is easy to assemble and minimizes associated routing costs.

SUMMARY OF THE INVENTION

The present invention is directed to a mechanism for controlling the flow of air between a freezer compartment and a fresh food compartment in a refrigerator. The control mechanism is constituted by a self-contained housing into which all the necessary parts of a controller are placed. This self-contained unit can therefore be pre-assembled and then mounted in the refrigerator. The housing has an air passageway extending therethrough for fluidly connecting the freezer compartment to the fresh food compartment. Two sets of controls are mounted in the housing.

The first controller is preferably constituted by an atmospheric controller for the freezer compartment and includes a manual control knob. More specifically, the manual knob is connected to a thermostatic controller which regulates the running time of the refrigerator compressor based on the position of the control knob and a temperature sensed by a capillary tube. The capillary tube is routed within the housing from the thermostatic controller to the air passageway where it senses a temperature associated with, not only the temperature of the freezer compartment, but also the temperature in the fresh food compartment. The capillary tube is routed through insulation placed in the housing around the air passageway and retained in place by a pair of protrusions extending from a capillary tube holder mounted about the air passageway. In addition, the capillary tube is preferably covered by a vinyl sleeve to provide for thermal damping. The second controller is an automatic damper unit for the fresh food compartment and also includes a manual knob. The manual knob is connected by a belt drive to the automatic damper unit mounted in the air passageway and thus controls the flow of air from the freezer compartment to the fresh food compartment.

In operation, a user sets the desired temperature for the freezer compartment using the appropriate manual control knob. The controller then senses a temperature affected by the temperature in both the freezer compartment and the fresh food compartment and adjusts the active time of the compressor accordingly. While this does not provide for complete independent control of the freezer compartment and the fresh food compartment, the change in temperature of the freezer compartment, due to a desired change in temperature of the fresh food compartment, is less than it would be if just the temperature of the fresh food compartment were measured. Furthermore, since the capillary tube is mounted in the air passageway, considerable cost savings are achieved in not having to route the tube through the mullion and its associated insulation.

Additional features and advantages of the control mechanism of the present invention will become more readily apparent from the following detailed description of a preferred embodiment thereof when taken in conjunction with the drawings wherein like reference numerals refer to corresponding parts in the several views.

BRIEF DESCRIPTION OF THE DRAWINGS

FIG. 2 is a top view of the control mechanism of FIG. 1 according to a preferred embodiment of the invention;

FIG. 3 is a side view of the control mechanism;

FIG. 4 is an exploded perspective view of the mechanism shown in FIGS. 2 and 3.

DETAILED DESCRIPTION OF THE PREFERRED EMBODIMENT

Figure 1:
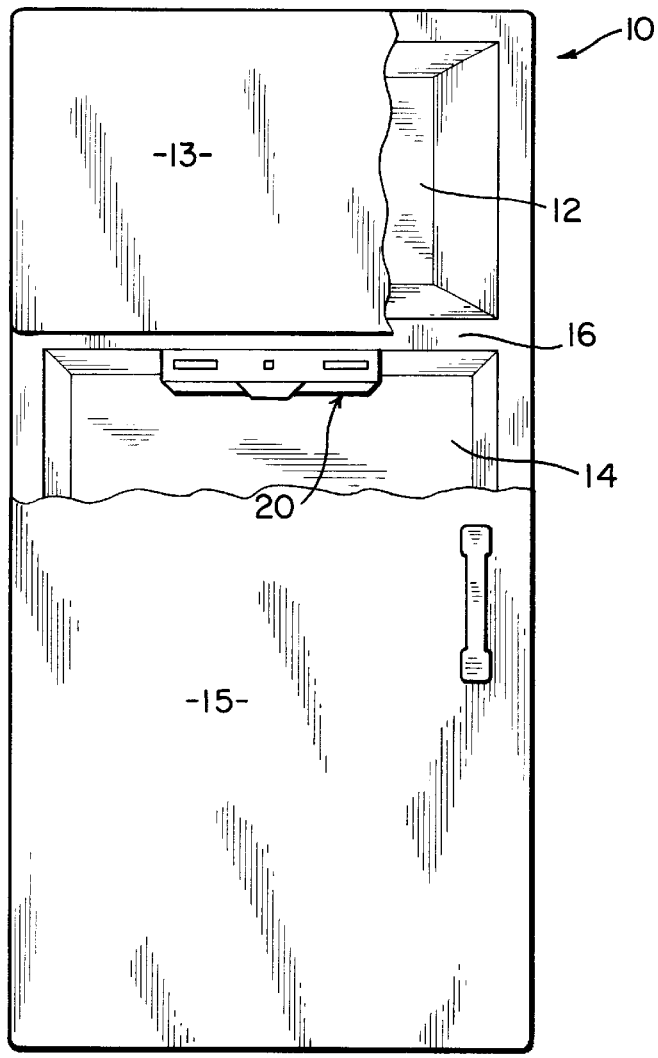
FIG. 1 is a front perspective view of a top mount refrigerator incorporating a mechanism for controlling the air temperature in, as well as the flow of air between, two compartments of the refrigerator according to a preferred embodiment of the invention.

With initial reference to FIG. 1, a top mount refrigerator is generally indicated at 10 and includes a relatively low temperature freezer compartment 12 adapted to be selectively sealed by a door 13 and a relatively high temperature fresh food compartment 14 having an associated door 15. Compartments 12 and 14 are separated by an insulated partition or mullion 16 having a vertical opening (not shown) therein. An evaporator (not shown), for use in refrigerating the two compartments 12, 14 in a manner known in the art, is housed in either the mullion or in a back portion of the freezer. In any event, it should be understood that refrigerator 10 incorporates a conventional closed refrigerant circuit (not shown) comprising the usual compressor, condenser, etc. that is linked to the evaporator. As also known in the art, refrigerator 10 incorporates an air circulating system (not shown) including a fan for directing air to the evaporator and then to the freezer compartment 12 with most of the air simply returning to the evaporator, while a portion of the air is directed to the fresh food compartment 14 through a temperature control mechanism 20 for controlling the air temperature in, and the air flow between, compartments 12 and 14. It is this control mechanism 20, as well as the manner in which it operates, that the present invention is directed as will be detailed below.

In FIG. 1, mechanism 20 is shown mounted below mullion 16. As can best be seen in FIGS. 2–4, temperature control mechanism 20 includes a control housing 22 which is preferably formed from a single injection molded piece that incorporates all of the elements of control. As shown in FIGS. 2 and 4, housing 22 is of a generally inverted T-shape. A first end portion 24 of housing 22 is adapted to contain user activated controls, while the second end portion 26 of housing 22 is provided with an air passageway 28 which is in fluid communication with the opening in mullion 16 that fluidly connects freezer compartment 12 to fresh food compartment 14. Preferably, a sectional insulation insert 29 is positioned with housing 22 about air passageway 28 for energy efficiency reasons.

More specifically, the first end portion 24 of control housing 22 slidably supports two control knobs 30 and 32. The first control knob 30 is used to manually regulate the air temperature in freezer compartment 12. First control knob 30 is mounted on a first control member 34 and projects through a first slot 36 formed in a decorative front panel 38 of control housing 22 so that it may be easily manipulated. Control member 34 is itself slidably mounted in housing 22 and is provided with a first rack of gear teeth 40. A temperature control unit, preferably in the form of a thermostat 42, is also mounted in control housing 22. Thermostat 42 includes a control shaft 43 having mounted thereon, for concurrent rotary movement, a first sprocket 44 having teeth 46. The first rack of teeth 40 on first control member 34 and teeth 46 of first sprocket 44 intermesh so that when first control knob 30 and first control member 34 are slidably shifted within control housing 22, first sprocket 44 rotates control shaft 43 to thereby adjust thermostat 42. Thermostat 42 is also operatively connected to a temperature sensing capillary tube 48. Capillary tube 48 is mounted in control housing 22 and is routed from thermostat 42 in the first end portion 24 of housing 22 to the air passageway 28 where it is affected not only by the temperature in freezer compartment 12, but also the temperature in fresh food compartment 14 as will be discussed more fully below. In the preferred embodiment, capillary tube 48 is located closer to freezer compartment 12 than fresh food compartment 14 so as to be exposed to a flow of air directly from freezer compartment 12.

Figure 5:
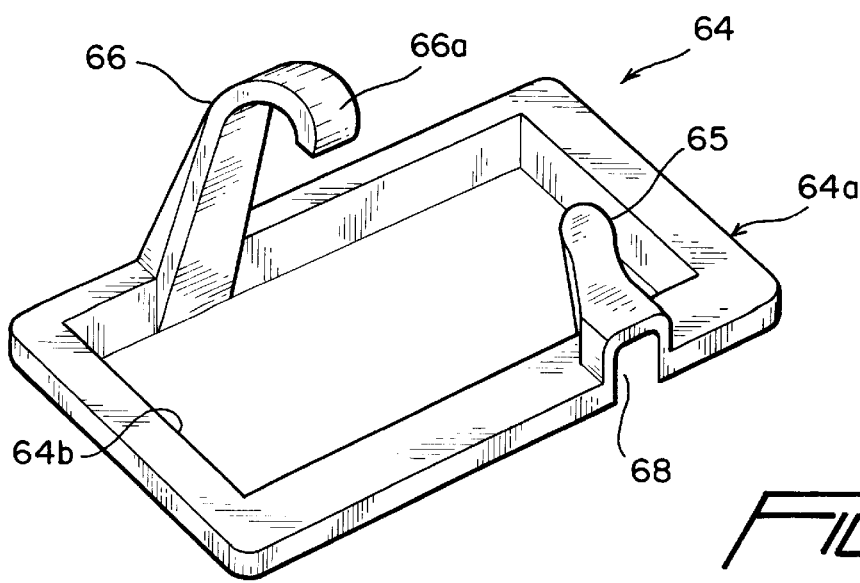
FIG. 5 is a perspective view of a capillary holder incorporated in the control mechanism of the invention.

As best seen in FIG. 5, a capillary holder 64 is provided with two protrusions 65 and 66 for guiding and holding the capillary tube 48 in a desired position within air passageway 28. In the preferred embodiment, capillary tube holder 64 is defined by a generally rectangular frame 64a that is seated in the insulation insert 29 and is provided with a central opening 64b which forms part of air passageway 28. This arrangement is perhaps best shown in FIG. 4 wherein capillary tube holder 64 is seated in second end portion 26 of control housing 22. Capillary tube 48 actually has a first end (not separately labeled) attached to thermostat 42 in first end portion 24 of control housing 22. From thermostat 42, capillary tube 48 is routed along a central portion 67 of control housing 22 towards air passageway 28. The capillary tube 48 extends into the capillary tube holder 64 through an opening 68 at one end portion of air passageway 28 (again see FIG. 5) where it comes into contact with a first protrusion 65 (not shown in FIG. 2 for clarity) extending above opening 68. Capillary tube 48 then extends away from opening 68 and towards freezer compartment 12 to a point approximately midway across air passageway 28. Finally, capillary tube 48 extends, laterally of refrigerator 10, across to the other side of air passageway 28 where the terminal end (not separately labeled) of capillary tube 48 is retained in place by a curved end portion 66a of second protrusion 66. As best shown in FIGS. 2 and 3, the terminal end portion of capillary tube 48 is preferably covered by a sleeve 70 mounted thereon for thermal damping purposes. In the preferred embodiment, at least three inches of capillary tube 48 is located within air passageway 28 and sleeve 70 is made of vinyl.

In operation, thermostat 42 receives an indication of a desired freezer compartment temperature based on the position of the first manual control knob 32. Thermostat 42 also receives signals from capillary tube 48 which, as discussed above, senses a temperature associated with both the freezer compartment 12 and the fresh food compartment 14. Based on these signals, thermostat 42 will control the operation of a conventional refrigeration circuit and, more particularly, the cycling time of a compressor and a circulating fan to ensure that the temperature in freezer compartment 12 is maintained at a desired temperature. Since this arrangement actually measures the temperature of cooling air traveling from freezer compartment 12 to fresh food compartment 14 and thus provides a signal associated with temperatures in both freezer compartment 12 and fresh food compartment 14, the temperature change in freezer compartment 12, when freezer compartment control member 34 is adjusted, will not be as great as it would be with a system which only senses the temperature of one of the compartments.

Referring now to FIGS. 2 and 4, second control knob 32 is used to adjust the air temperature in fresh food compartment 14. Control knob 32 is slidably mounted in control housing 22 and is used to set an automatic damper unit 71 to effect either an increase or a decrease of the temperature in fresh food compartment 14. Knob 32 is formed as part of a second control member 72 and projects through a second slot 74 in decorative front panel 38 and out of control housing 22 so that it may be easily manipulated. Second control member 72 is actually slidably mounted in first end 24 of control housing 22 and is formed with a second rack of teeth 76. A belt drive assembly 78 operatively connects second control member 72 to automatic damper unit 71 (see FIG. 2) that controls the positioning of an air baffle plate 80 located in air passageway 28 based on temperatures sensed by a capillary tube 48 associated with the automatic damper unit 71. Belt drive assembly 78 includes a second sprocket 82 constituted by first and second integral gears 84 and 86 that are rotatably mounted on a shaft 87 provided in first end 24 of control housing 22 adjacent second control member 72. The first gear 84 has teeth 88 which mesh with the second rack of teeth 76, while the second gear 86 engages belt 90. Belt 90 is routed through housing 22 by a series of guides 92a–92d to a third sprocket 94 located in second end 26 of housing 22 adjacent air passageway 28. Third sprocket 94 is operatively associated with the automatic damper unit 71 which again selectively controls the amount of air flowing through air passageway 28.

In operation, a user would slide second control knob 32 to a desired fresh food temperature. The resulting sliding movement of second control knob 32 would, in turn, rotate second sprocket 82 since the second rack of teeth 76 on second control knob 32 meshes with teeth 88 on first gear 84 of second sprocket 82. Rotation of second sprocket 82 would, by means of second gear 86, cause belt 90 to move and thus third sprocket 94 to rotate. Rotation of third sprocket 94 would then set automatic damper unit 71 to allow a certain range of movement for baffle plate 80. The actual movement of baffle plate 80 would be determined based on the sensed temperature by capillary tube 48 to establish a desired amount of air to travel through air passageway 28. For example, if a user desires the fresh food compartment 14 to be colder, second control knob 32 would be adjusted to cause automatic damper unit 71 to enable more air to be allowed to flow from freezer compartment 12 to fresh food compartment 14 when the refrigeration circuit is activated. The air temperature sensed by the capillary tube 48 is actually used in connection with thermostat 42 to activate, or deactivate the refrigeration circuit in order to maintain the freezer compartment 14 at its set temperature. Of course, cooling of the freezer compartment 12 would, in turn, alter the temperature in fresh food compartment 14 in dependence upon the degree of opening of baffle plate 80.

For the sake of completeness, a first light 96 and a second light 98 are also mounted in control housing 22. In the preferred embodiment, each light 96, 98 is positioned at a respective side of first end portion 24 of control housing 22. Guards 100 and 102 are mounted around each of the lights 96, 98 to protect them from damage as items are placed in the 10 fresh food compartment 14. Lights 96 and 98 are activated by a switch 104 mounted so as to be operated by a refrigerator door in a customary manner. A light pipe 106, 108 is mounted near each of the pair of lights 96, 98 in order to illuminate each control knob 30, 32 and the decorative front panel 38. A defrost timer 110 is also mounted in the housing 22 and works in a conventional manner. For mounting within fresh food compartment 14, housing 22 is provided with two pegs 112a and 112b that extend from second end 26 of housing 22, as well as screw receiving slots 114 and 116 and bosses 120 and 121. Pegs 112a and 112b are adapted to mate with sockets formed in the liner of fresh food compartment 14 and then mechanical fasteners are secured into the liner at slots 114 and 116. For the sake of completeness, it should also be noted that housing 22 is provided with a drain trough 125 for evaporator coil runoff.

In the preferred embodiment, control housing 22 is formed by a conventional injection molding process. Then all of the above-mentioned control elements are mounted in control housing 22. One of the many benefits of this invention is that the capillary tube 48 itself can be routed to its final position in the control housing 22 before the housing 22 is placed in refrigerator 10. This obviates the need to route the capillary tube 48 through insulation and other refrigerator structure to enter the freezer compartment 12. In fact, once all of the different control elements are mounted in housing 22, housing 22 can easily be mounted in refrigerator 10 by inserting pegs 112a and 112b in the fresh food liner of refrigerator 10 and fastening screws (not shown) at the screw mounting slots 114 and 116 and bosses 120 and 121 as discussed above.

Although described with respect to a preferred embodiment of the invention, it should be readily apparent that various changes and/or modifications can be made to the invention without departing from the spirit thereof. In general, the invention is only intended to be limited by the scope of the following claims.

We claim:

1. In a refrigerator with a freezer compartment and a fresh food compartment separated by a partition having an opening therein, a mechanism for controlling temperatures in and a flow of air between the compartments, said mechanism comprising:

a housing adapted to be mounted in the refrigerator, said housing including a portion defining an air passageway in fluid communication with said opening for fluidly connecting the freezer compartment to the fresh food compartment through said air passageway;

a temperature control unit mounted in said housing;

a temperature sensor holder arranged in the air passageway; and a temperature sensor having a first portion which terminates in said air passageway and is held in a desired position by the temperature sensor holder, and a second portion connected to said temperature control unit.

2. The mechanism according to claim 1, wherein the temperature sensor comprises a capillary tube.

3. The mechanism according to claim 2, further comprising means for dampening a response of said mechanism to temperature change by insulating the first portion of said capillary tube.

4. The mechanism according to claim 3, wherein said means for dampening comprises a vinyl sleeve surrounding the first portion of said capillary tube.

5. The mechanism as claimed in claim 2, wherein said temperature sensor holder is formed with at least one protrusion for holding the capillary tube.

6. The mechanism as claimed in claim 5, wherein the temperature sensor holder positions the first portion of said capillary tube closer to the freezer compartment than to the fresh food compartment.

7. The mechanism as claimed in claim 5, wherein the temperature sensor holder retains at least three inches of the capillary tube within the air passageway.

8. The mechanism as claimed in claim 5, wherein said capillary tube enters at one side of said passageway and extends generally perpendicular to a direction of air flow in said air passageway, towards an opposite side of said air passageway.

9. The mechanism as claimed in claim 2, further comprising an automatic damper unit for controlling a degree of opening of said air passageway.

10. The mechanism according to claim 9, further comprising:

a manual control knob mounted in said housing; and a belt drive mechanism connecting said control knob to said automatic damper unit.

11. In a refrigerator with freezer and fresh food compartments separated by a partition, a mechanism for controlling the temperature and flow of air between the compartments through an air passageway, said mechanism comprising:

a temperature control unit;

a capillary tube having a first end connected to said temperature control unit and a second end; and an insulator extending about and covering a second end of said capillary tube for dampening a temperature change response of said mechanism, said insulator being defined by a sleeve placed over the second end of said capillary tube.

12. The mechanism as claimed in claim 11, wherein said capillary tube enters at one side of said air passageway and extends, in a direction generally perpendicular to a direction of air flow in said air passageway, towards an opposite side of said air passageway.

13. The mechanism as claimed in claim 11, wherein said sleeve is made of vinyl.

14. The mechanism as claimed in claim 11, further comprising a capillary holder positioned at said air passageway, said capillary holder being formed with at least one protrusion for holding the capillary tube.

15. The mechanism as claimed in claim 11, further comprising an automatic damper unit for controlling a degree of opening of said air passageway.

16. The mechanism according to claim 15, further comprising:

a manual control knob, a belt drive connecting said control knob to said automatic damper unit.

17. A method of controlling an air flow and relative temperature between freezer and fresh food compartments in a refrigerator comprising:

directly sensing a temperature of air flowing from the first compartment to the second compartment through an air passageway defined by a control housing through a temperature sensor arranged in the air passageway at a position closer to the freezer compartment than the fresh food compartment; and relaying the sensed temperature to a temperature control unit for use in regulating a cycling of a refrigeration circuit.

18. The method as claimed in claim 17, further comprising: directly sensing the temperature by positioning a capillary tube in the air passageway between the freezer and fresh food compartments.

19. The method as claimed in claim 18, further comprising:

dampening the temperature sensed by said capillary tube by providing a sleeve over at least a portion of the capillary tube in said air passageway.

* * * * *